(12) United States Patent
Murdock et al.

(10) Patent No.: US 7,227,585 B1
(45) Date of Patent: Jun. 5, 2007

(54) LUMINANCE AND CHROMINANCE SEPARATION SYSTEM

(75) Inventors: Peter M. Murdock, San Diego, CA (US); John E. Welch, Encinitas, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 420 days.

(21) Appl. No.: 10/776,075

(22) Filed: Feb. 11, 2004

Related U.S. Application Data

(60) Provisional application No. 60/533,294, filed on Dec. 30, 2003.

(51) Int. Cl.
*H04N 9/66* (2006.01)
*H04N 9/78* (2006.01)

(52) U.S. Cl. .................... 348/641; 348/638; 348/667; 348/666

(58) Field of Classification Search ........ 348/638–641, 348/663–670
See application file for complete search history.

(56) References Cited

U.S. PATENT DOCUMENTS

| 3,715,469 A | * | 2/1973 | Tamaru et al. | 348/640 |
| 3,877,066 A | * | 4/1975 | van Gils et al. | 348/509 |
| 4,626,928 A | * | 12/1986 | Nagano | 386/41 |

* cited by examiner

*Primary Examiner*—Michael H. Lee
(74) *Attorney, Agent, or Firm*—Farjami & Farjami LLP

(57) ABSTRACT

Provided are decoding methods and decoders for separating luminance and chrominance components of a video signal. In one aspect, a reference subcarrier of a first line of the video signal is used for subsequent lines by applying an appropriate rotation to the reference subcarrier of the first line for each subsequent line. In another aspect, comb filtering is adaptively controlled based on determining whether 90 or 180 degrees relationship is maintained from line to line. In a further aspect, both complimentary and non-complimentary comb filtering are implemented. In yet another aspect, SECAM bell filtering is achieved by rotating the video signal to obtain a baseband signal, low-pass filtering and modulating the baseband signal, and subtracting the modulated low-pass filtered baseband signal from the video signal to notch the chroma component from the luma component.

8 Claims, 9 Drawing Sheets

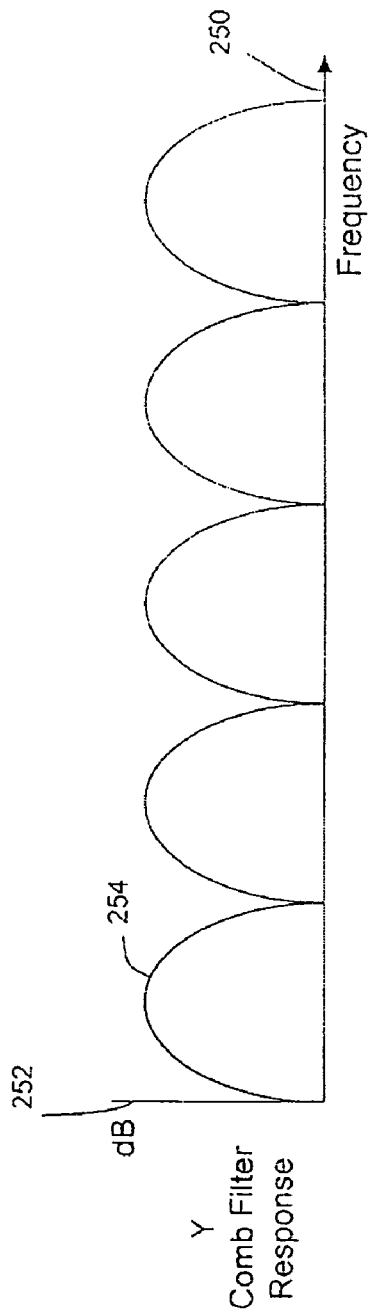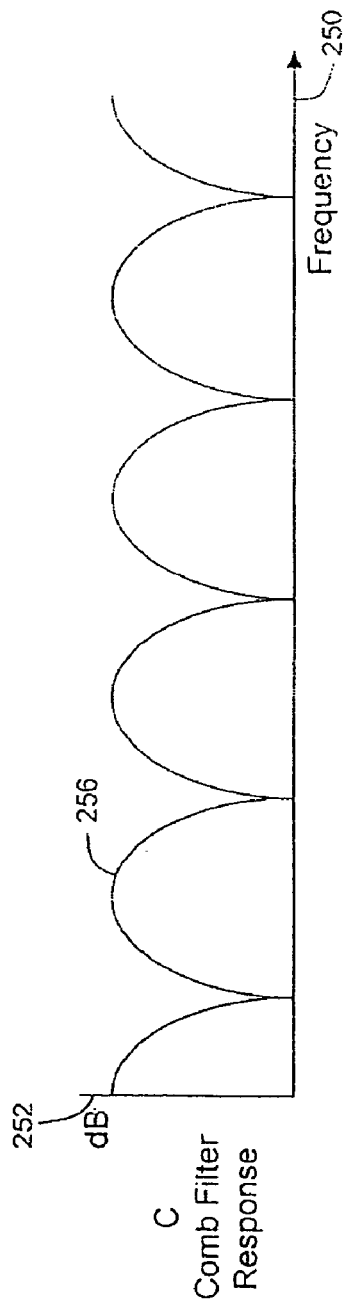

LUMINANCE AND CHROMINANCE SEPARATION SYSTEM

RELATED APPLICATIONS

The present application claims the benefit of U.S. provisional patent application Ser. No. 60/533,294, filed Dec. 30, 2003, which is hereby fully incorporated by reference in the present application. This application relates to a co-pending U.S. patent application Ser. No. 10/776,121, filed concurrently with the present application, entitled "Comb Filter Design for Separating Luminance and Chrominance in Video Signals", which is hereby fully incorporated by reference in the present application.

BACKGROUND OF THE INVENTION

1. Field of the Invention

The present invention relates generally to video signal decoders and, more specifically, to methods and systems for separating luminance and chrominance in composite signals.

2. Related Art

Generally, video pictures or video signals are made up of video content signals, horizontal sync pulses and vertical sync pulses. Typically, a video picture includes a number of video frames. For example, according to the NTSC (National Television System Committee) format, there are 30 frames per second, and according to the PAL (Phase Alternation by Line) format, there are 25 frames per second. At the end of each frame, a vertical sync pulse is transmitted which indicates to a recipient electronic device that the frame has come to an end. Further, each video frame is made up of lines. In NTSC, there are 525 lines per frame, whereas, in PAL, there are 625 lines per frame. Each point in the line reflects the intensity of the video signal. At the end of each line, a horizontal sync pulse is transmitted which indicates to the recipient electronic device that the line has come to an end, so that the electronic device gets ready for the next line.

The screens of most monitors of electronic devices are drawn in a series of lines, left to right and top to bottom. When the monitor finishes drawing one line and reaches its right-most excursion, the beam is turned off while the monitor returns the beam to the left side of the screen. A similar process occurs when the last line on the screen is finished drawing, in which event, the beam traverses to the top left corner of the screen. In a video picture, the beam is moved to the left of the screen and to the top of the screen in accordance with and based on the detection of the synchronization signals. In other words, when the vertical sync pulse is detected the beam moves to the top left corner of the screen to begin drawing the next frame, and when the horizontal sync pulse is detected, the beam moves to the left of side of the screen to begin drawing the next line. Accordingly, it is quite important to properly detect the sync pulses.

Due to limitations on available bandwidth and the increased demand to transmit additional information on existing bandwidth, it is often necessary to multiplex or combine two or more information signals into a single composite signal.

A color television signal is an example of a composite signal. A color television signal comprises a luminance (brightness) component and a chrominance (color) component. These components are often represented as Y and C components wherein Y represents the luminance component and C represents the chrominance component.

Originally, broadcast television in the United States began with black and white broadcast and therefore lacked the chrominance component, C, of modern television's composite signal. Television standards and technology required that the black and white television signal, that is, the luminance component (Y), reside within 6 megahertz (MHz) of bandwidth space.

Eventually, however, technology advanced to provide color television. To allow black and white televisions to receive the new color signal broadcast, the color signal standard located the color information within the same 6 MHz of bandwidth space allotted to each channel of the black and white signal. Under this standard, the color information overlaps with the luminance information.

FIG. 1A illustrates a composite television signal on a coordinate system in which the horizontal axis 100 represents frequency and the vertical axis 102 represents amplitude. Signal line 104 represents the luminance information (Y) while line 106 represents the chrominance information (represented as I and Q) of the composite signal. As shown, the frequencies of these signals 104, 106 overlap. In an NTSC (National Television Standards Committee) system, the luminance information occupies the range DC to 4.2 MHz of bandwidth while the chrominance signal is band-limited to the range approximately 0.6 to 1.3 MHz and is modulated onto a carrier at 3.58 MHz. The audio portion of the signal is at 4.5 MHz. While these two data signals conveniently fit within the 6 MHz of bandwidth space they are allotted, obvious decoding challenges are presented in order to separate the luminance information from the chrominance information.

FIG. 1B illustrates video signal line 120, which includes horizontal front porch 122, horizontal sync pulse 124, horizontal back porch 128, color burst 126 and horizontal active pixels 130. As shown, video signal line 120 begins at the falling edge of horizontal sync pulse 124 and ends at the falling edge of the next horizontal sync pulse. Horizontal front porch 122 is the period of time between the previous horizontal active pixels (not shown) and the beginning of horizontal sync pulse 122. Horizontal sync pulse 122 is a change in voltage of the video signal, which triggers the electronic device to stop the rightward progress of drawing the beam and begin drawing on the left side of the screen. Thus, each line begins with the start of the horizontal sync pulse and ends with the start of the next horizontal sync pulse. Horizontal back porch 128 is the period of time between the end of horizontal sync pulse 124 and the beginning of horizontal active pixels 130. According to NTSC and PAL formats, horizontal back porch 128 also includes color burst 126, as a color calibration reference.

The first decoding scheme adopted to separate the overlapping luminance (Y) and chrominance (C) signals comprises simple notch filtering in combination with band pass filtering. FIG. 2 illustrates a block diagram of a basic notch filter 152 and band pass filter 154. An incoming composite signal on line 150 is presented to both of the notch filter 152 and the band pass filter 154.

FIG. 3 illustrates the frequency response of a notch filter 152 and a band pass filter 154. The output of the notch filter generally comprises the luminance portion 174 of the composite signal while the output of the band pass filter generally comprises the chrominance portion 176 of the composite signal.

In particular, for NTSC video, the notch filter removes a portion of the composite signal centered at 3.58 MHz, but allows the remainder 174 to pass. While the notch filter 152 allows the majority of the luminance information 174 to pass, it undesirably removes components of the luminance signal having frequencies within the range of the notch filtered frequencies 177. The notch filtered frequencies that are removed range from 2.5 to 4.5 MHz. Stated another way, the notch filter allows the frequency band below 2.5 MHz and the frequency band above 4.5 MHz to pass.

The band pass filter 154 configured to operate in accord with the NTSC standard video allows a 2 MHz portion of the composite signal centered at 3.58 MHz to pass while removing portions outside of this band. This portion of the composite signal contains all the chrominance information. Undesirably, however, the output of the band pass filter also contains luminance components having frequencies within the band pass filter's frequency band.

Notch and band pass filtering suffers from numerous drawbacks as can easily be understood with reference of FIG. 3. In particular, the band pass filtered chrominance portion of the composite signal also contains luminance information, i.e., band pass filtering does not remove all luminance information from the chrominance signal. The unwanted luminance information in the chrominance signal introduces artifacts into the video image. This is most noticeable in pictures that contain closely spaced black and white lines, such as when the video display is of person is wearing a herringbone jacket.

Likewise, notch filtering the composite signal to remove the chrominance information from the composite signal to obtain the luminance information removes valuable portions of the luminance signal. A loss of luminance information is especially critical due to the human eye's sensitivity to brightness and contrast variations in a projected image.

FIG. 4 illustrates a conventional basic comb filter. In operation, a composite signal arrives at input 230 and branches into a line store 232, a first summing point 234 and a second summing point 236. The line store delays the incoming composite signal for a time equivalent to the period of one line. Further, some methods and systems utilizing comb filters for YC separation are described in U.S. Pat. No. 6,175,389, entitled "Comb Filtered Signal Separation", issued Jan. 16, 2001, which is hereby incorporated by reference in its entirety.

In regions of the video image where the Y, I, and Q components on one line are the same as the previous line, the composite signal for one line is similar to the composite signal for the previous line. However, differences in phase do exist. The luminance portion of the composite signal is the same for both lines, but the chrominance portion of the composite signal for one line is phase shifted by 180 degrees compared to the chrominance portion of the composite signal for the previous line. This occurs because the subcarrier is phase shifted by 180 degrees relative to the previous line. With reference to FIG. 4, these phase differences and the additive and subtractive properties of the feed around loop cause the unwanted portions of the chrominance and luminance signals to cancel. The luminance signal is provided on a line 238 and the chrominance signal provided on a line 240.

Conventionally, comb filters have a frequency response configured to filter out a particular repeating frequency pattern in signals that are offset in time. The frequency response of a comb filter is illustrated in FIGS. 5A and 5B. The horizontal axis 250 represents frequency and the vertical axis 252 represents filter response in dB. As shown in FIG. 5A, the comb filter frequency response for the luminance portion (Y) of the signal is represented by line 254. Similarly, FIG. 5B illustrates the comb filter frequency response for the chrominance portion (C) of the signal, represented by line 256. In effect, the comb filter acts as a notch filter with a plurality of combs or teeth centered on or aligned with the frequency components of the desired signal. Because of its configuration, the comb filter excels in situations where the composite signal is stable or consistent from line-to-line such as, for example, in an area of solid color. Undesirably, however, at portions of a signal representing vertical transitions between colors or areas of motion in the video image, the comb filtering technique is undesirable, because conventional comb filtering creates artifacts at vertical transitions between differing colors and adjacent to moving objects.

A further drawback of utilizing conventional comb filters is that such filters are sensitive to imperfections in the line-to-line subcarrier phase difference. This sensitivity results from the line store 232 and the summing points 234, 236 in the comb filter. Subcarrier phase differences occur when the phase between the current signal and a line stored signal is other than 180 degrees out of phase. In such a situation, rather than perfectly adding or canceling at the summing points 234, 236, the signals, being out of phase, combine inaccurately and provide inaccurate luminance and chrominance signals.

Therefore, there is a need for methods and systems for a more robust separation of luminance and chrominance components of composite signals without great additional cost and complexity.

SUMMARY OF THE INVENTION

In accordance with the purpose of the present invention as broadly described herein, there are provided decoding methods and decoders for separating luminance and chrominance components of a video signal. In one aspect, a reference subcarrier of a first line of the video signal is used for subsequent lines by applying an appropriate rotation to the reference subcarrier of the first line for each subsequent line. In another aspect, comb filtering is adaptively controlled based on determining whether 90 or 180 degrees relationship is maintained from line to line. In a further aspect, both complimentary and non-complimentary comb filtering are implemented. In yet another aspect, SECAM bell filtering is achieved by rotating the video signal to obtain a baseband signal, low-pass filtering and modulating the baseband signal, and subtracting the modulated low-pass filtered baseband signal from the video signal to notch the chroma component from the luma component.

According to one aspect, there is provided a method of obtaining a reference subcarrier in each of a plurality of video signal lines for demodulating a chrominance portion of each of the plurality of video signal lines into U and V components. The method comprises locking onto a first reference subcarrier of a first video signal line of the plurality of video signal lines: demodulating the chrominance portion of the first video signal line into first U and V components using the first reference subcarrier; and obtaining each of the reference subcarrier in each of subsequent the plurality of video signal lines by rotating the first reference subcarrier for a predetermined number of degrees. In a further aspect, the predetermined number of degrees is 90 degrees or 180 degrees. In another aspect, the obtaining each of the reference subcarrier in each of subsequent the plurality of video signal lines includes inversion, sin/cos swapping low pass filtering of the first reference subcarrier.

In a separate aspect, a method is provided for controlling a comb filter for comb filtering a plurality of video signal lines to demodulate a chrominance portion of each of the plurality of video signal lines into U and V components. The method comprises determining a first reference subcarrier of a first video signal line of the plurality of video signal lines; demodulating the chrominance portion of the first video signal line into first U and V components using the first reference subcarrier; using the first U and V components to determine a number of degrees of rotation of the first reference subcarrier from a second reference subcarrier of a second video signal line previous to the first video signal line; and disabling the comb filter if the number of degrees is different from a predetermined number of degrees. In a further aspect, the predetermined number of degrees is 90 degrees or 180 degrees. In another aspect, the method further comprises enabling the comb filter if the number of degrees is the same as a predetermined number of degrees.

In another separate aspect, there is provided a method of decoding a video signal including a first video signal line and a second video signal line using a luma comb filter and a chroma comb filter. The method comprises obtaining a first chroma data for a first video signal line using the chroma comb filter; obtaining a second chroma data for a second video signal line using the chroma comb filter, wherein the first video signal line is adjacent to the second video signal line; obtaining a first luma data for a first video signal line using the luma comb filter; obtaining a second luma data for a second video signal line using the luma comb filter; using the chroma comb filter and the luma comb filter in a complimentary mode if there is correlation between the first chroma data and the second chroma data and there is no correlation between the first luma data and the second luma data; and using the chroma comb filter and the luma comb filter in a non-complimentary mode if there is correlation between the first chroma data and the second chroma data and there is correlation between the first luma data and the second luma data. In a further aspect, the method further comprises disabling the chroma comb filter and the luma comb filter if there is no correlation between the first chroma data and the second chroma data and there is no correlation between the first luma data and the second luma data.

In a separate aspect, there is also provided a method of SECAM bell filtering a video signal to separate a luma component from a chroma component of the video signal. The method comprises rotating the video signal down to baseband using a chroma demodulator to obtain a baseband signal; low-pass filtering the baseband signal to generate a low-pass filtered baseband signal; modulating the low-pass filtered baseband signal to generate a modulated low-pass filtered baseband signal; and subtracting the modulated low-pass filtered baseband signal from the video signal to notch the chroma component from the luma component. In a further aspect, the method further comprises applying a bell filter to the modulated low-pass filtered baseband signal.

According to other aspects, systems, devices and computer software products or media for decoding video signals in accordance with the above techniques are provided.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF DRAWINGS

The features and advantages of the present invention will become more readily apparent to those ordinarily skilled in the art after reviewing the following detailed description and accompanying drawings, wherein:

FIG. 5A illustrates a conventional plot of the frequency response of a comb filter configured to separate the luminance components of a composite signal;

FIG. 5B illustrates a conventional plot of the frequency response of a comb filter configured to separate the chrominance components of a composite signal;

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, filters, controllers, comparators, counters, adders, gain controls, logic elements, and the like, which may carry out a variety of functions under the control of one or more microprocessors or other control devices. Further, it should be noted that the present invention may employ any number of conventional techniques for data transmission, signaling, signal processing and conditioning, sampling, filtering, and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional analog and digital circuits, circuit components, filters, integrators, controllers, comparators, counters, data transmission, signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections might be present in a practical communication system.

Figure 1A:
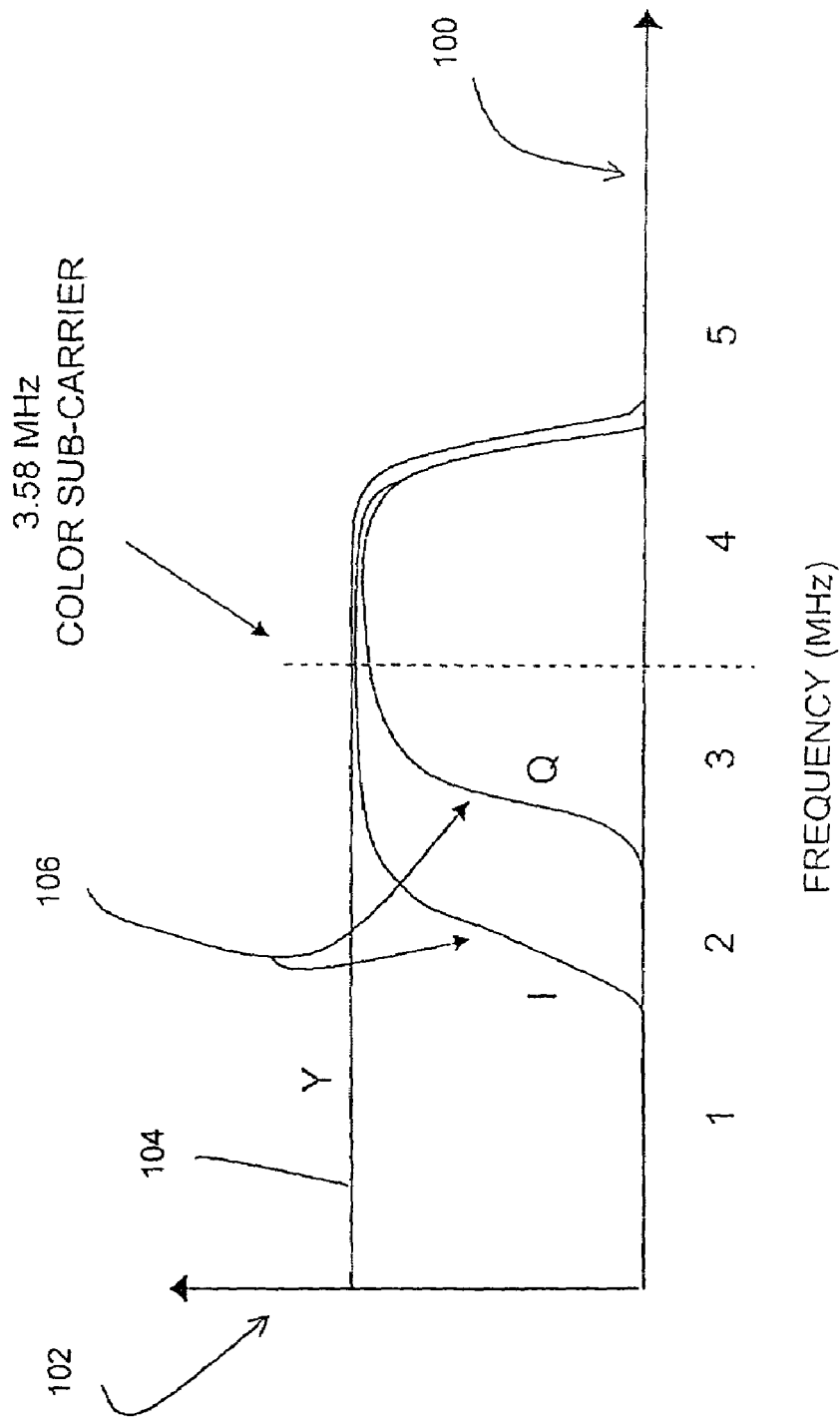
FIG. 1A illustrates a conventional frequency plot of the components of a composite video signal.
Figure 1B:
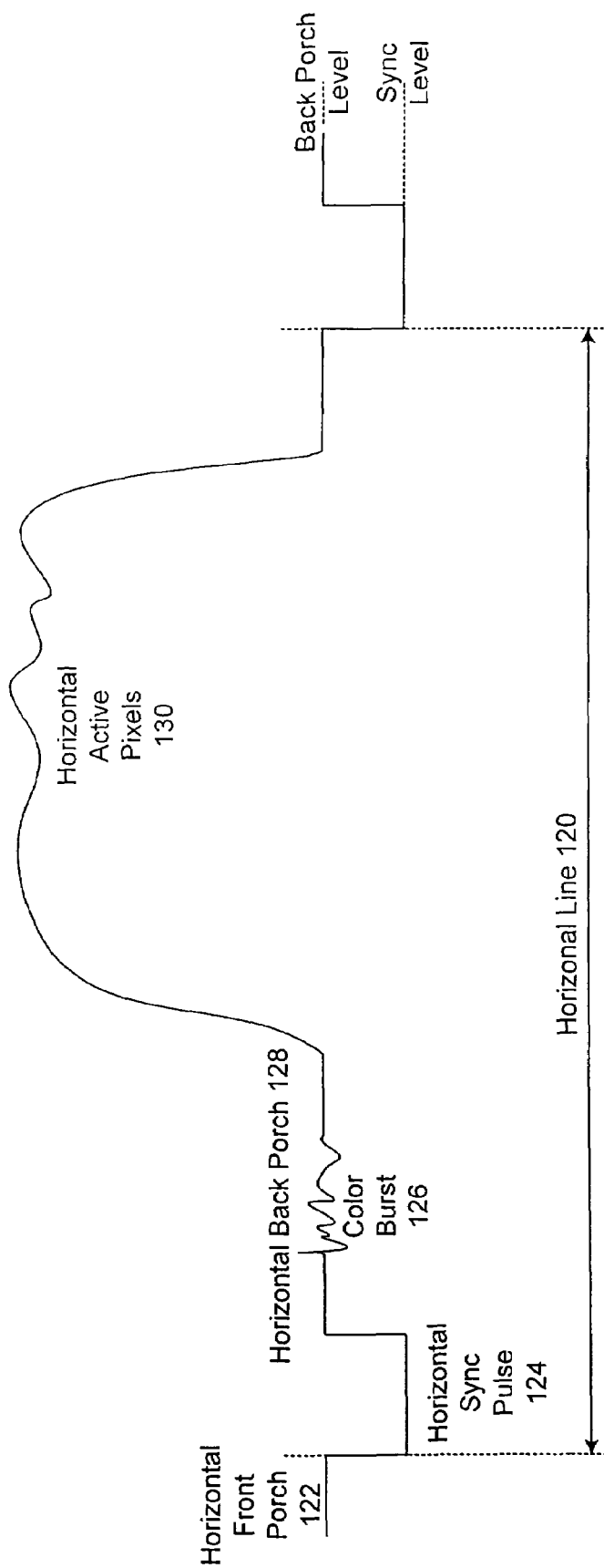
FIG. 1B illustrates a typical video signal line, including horizontal front porch, horizontal sync pulse, horizontal back porch, color burst and horizontal active pixels.
Figure 2:
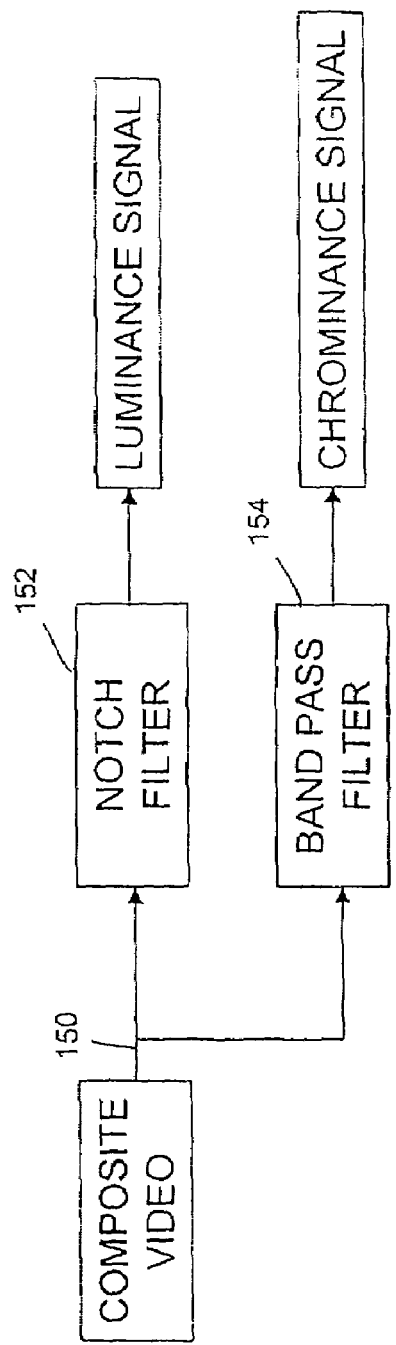
FIG. 2 illustrates a conventional block diagram of a combined notch and band pass filter.
Figure 3:
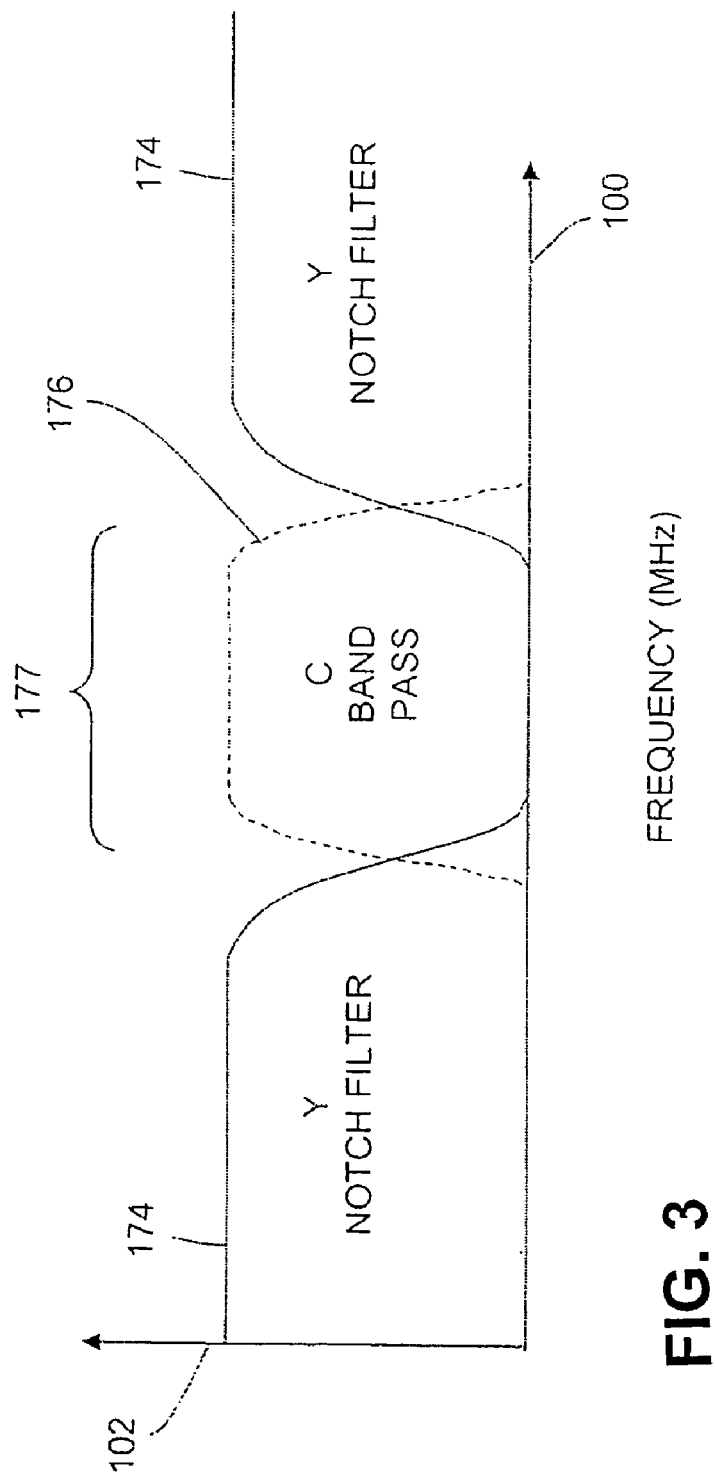
FIG. 3 illustrates a conventional plot of the frequency response of a notch and band pass filter configured to filter a composite video signal.
Figure 4:
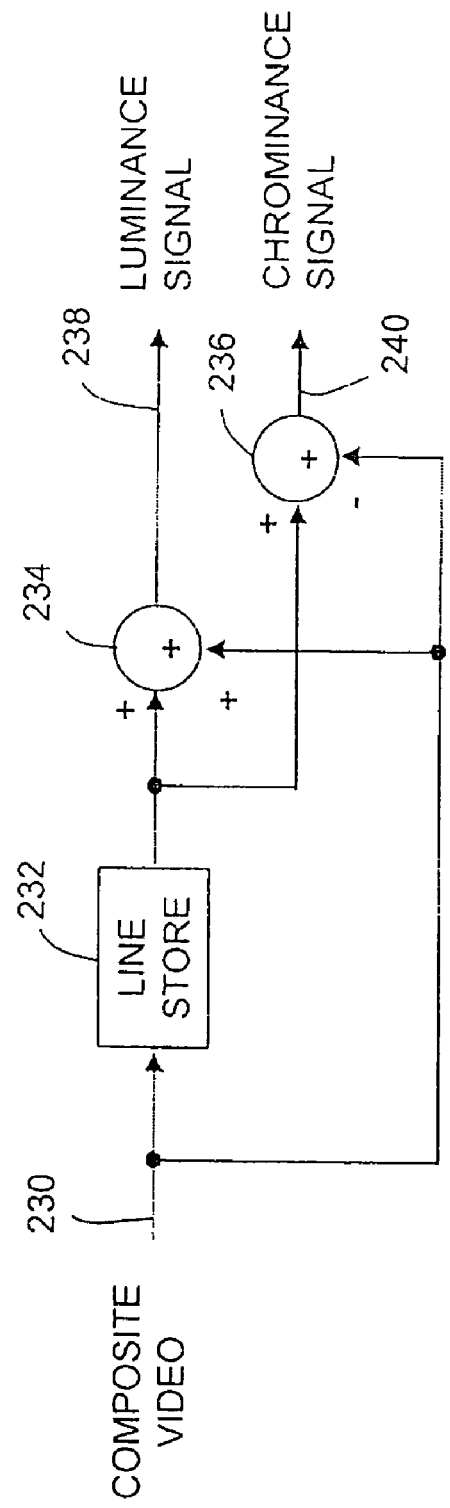
FIG. 4 illustrates a conventional block diagram of a basic comb filter.
Figure 6:
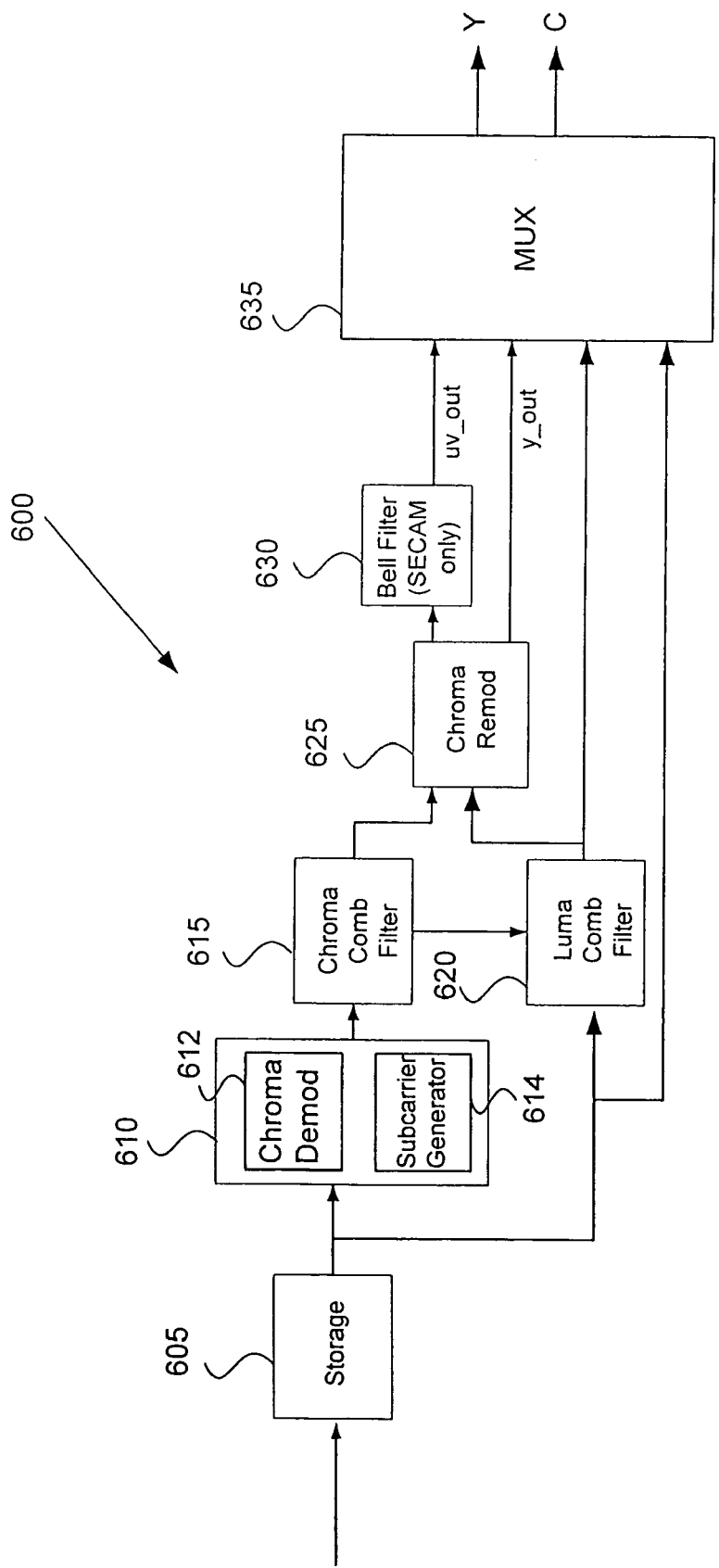
FIG. 6 illustrates a luminance and chrominance separation system, according to one embodiment of the present invention.

With reference to FIG. 6, an architecture overview of luminance/chrominance (Y/C) separation system 600 is provided in accordance with one embodiment of the present invention. Y/C separation system 600 separates a composite input into its luminance (or luma), U, and V components. For S-video inputs, the chrominance (or chroma) data will be demodulated into its U and V components. As such, Y/C separation system 600 performs both luma/chroma separation and chroma demodulation.

In one embodiment, Y/C separation system 600 is a 5-line (not shown) adaptive comb filter, with fallback to a simple notch filter. The notch filter also has a special mode for SECAM. The comb filter implements two algorithms, one algorithm for NTSC and one algorithm for PAL, because the NTSC color carrier has a 180-degree phase shift between adjacent lines, while the PAL color carrier has only a 90-degree phase shift between adjacent lines. It should be noted that these and other algorithms can be stored in various memory components and executed by controller(s) that are not shown or described in detail herein, since such implementations are within the knowledge of those of ordinary skill in the art.

A conventional NTSC comb filter performs the comb operation on the composite signals and bandpass filtered signals, and would then demodulate the separated chroma. However, the 90-degree phase shift and the phase switch of PAL pose unique challenges with this conventional approach. In contrast, in one embodiment of the present invention, Y/C separation system 600 first demodulates the chroma into U and V components directly from the composite signal, before applying the comb operations. This means that the comb operation would operate on baseband U/V signals, rather than bandpass filtered chroma signals.

Chroma demod module 610 implements a standard QAM demodulation approach by multiplying the composite signal by reference quadrature sine waves, thereby rotating the U and V content to baseband. Chroma demod module 610 includes the color burst locking loop, reference subcarrier generation, and the QAM demod functionality. The output is low-pass filtered to remove both the image frequencies and the extraneous luma frequencies. This also has the advantage of eliminating a more complex bandpass filter. Further, dependencies on the PAL phase switch are inherently removed in the process.

The comb filter operation is basically a sum or difference operation on two lines of the video sequence. The sum or difference will reinforce one component and cancel out the other, because the chroma components will have 180-degree phase changes between adjacent lines for NTSC, or every two lines for PAL. Accordingly, the two lines may be summed to obtain the luma channel, or subtracted to obtain the chroma channel. If both comb operations are performed independently on the demodulated and composite signals, the outputs are called non-complementary outputs, meaning one cannot necessarily sum the resultant luma and chroma components to obtain the original composite input. To obtain complementary outputs, one can perform only one of the comb operations, and obtain the other channel by subtracting the result from the current line's composite signal. These are complementary because the luma and chroma can be summed to produce the composite input.

In one embodiment, Y/C separation system 600 provides both a luma comb filter and a chroma comb filter to allow both approaches. A superior result may be obtained by using dual chroma and luma comb filters to produce non-complementary outputs.

Further, Y/C separation system 600 is adaptive and decides, on a pixel-by-pixel basis, whether a notch approach, a chroma comb complementary approach, or a dual chroma-luma approach will produce the best results. One adaptive algorithm of the present invention takes advantage of a total of five lines, which stores four lines of data.

Further, if Y/C separation system 600 operates in the complementary mode, the chroma must be subtracted from the composite waveform. To this end, the U/V components must be first re-modulated back to their original frequencies around the chroma carrier, which is performed by chroma remodulation module 625. If Y/C separation system 600 operates in the non-complementary mode, chroma remodulation module 625 is disabled and the luma is passed straight through.

In SECAM mode, Y/C separation system 600 will be bypassed and only a notch filter approach is utilized to separate the luma and chroma frequency bands. As for NTSC and PAL, the composite waveform will be rotated down to baseband in chroma demod module 610. However, in SECAM, unlike NTSC and PAL, the subcarrier loop operates at a fixed frequency, and does not try to lock to a burst reference. After low-pass filtering, the chroma band will be remodulated and subtracted from the composite signal, effectively notching the chroma from the luma. This quadrature baseband representation of the SECAM FM modulated carrier is then passed through SECAM Bell filter 630. SECAM Bell filter 630 is a complex filter that implements the inverse of the FM de-emphasis filter that is applied to the carrier before transmission. Of course, SECAM Bell filter 630 is bypassed in NTSC or PAL modes.

As explained above, a comb filter takes advantage of the 180° (NTSC) or 90° (PAL) phase shift in the color subcarrier from line to line or frame to frame to recover luminance data from the bandwidth occupied by the chrominance data, and remove residual subcarrier from the luminance channel. Y/C separation system 600 can support both a 3D (multiple frame) motion adaptive comb filter, and a 2D (multiple line) adaptive comb filter. In applications requiring a 3D comb filter, an external double frame store memory can be used.

For both 3D and 2D applications, memory or storage 605 provides an internal four-line memory. Both the 3D and 2D comb filters can be used in either complimentary mode (where the comb filtered chroma is subtracted from the composite signal) or non-complimentary (where a separate luma comb removes the color across the entire composite bandwidth.)

Since determining the difference between chrominance error and recovered luma is not possible when the chroma is shifted 180° relative to the luma, comb filter decisions are based on either in phase pixels in the case of NTSC, or orthogonal pixels in the case of PAL. Y/C separation system 600 stores two frames in a frame store memory area and four lines in a line store memory area of storage 605.

For the 3D comb filter, Y/C separation system 600 uses both the data from two past frames as well as the data from one past frame to detect motion in the picture, and then uses the data from one past frame to perform the comb filtering operations. When motion is detected, the 3D comb filter falls back to the 2D comb filter. This architecture provides robust behavior in the presence of motion, and excellent separation for static images.

Figure 7:
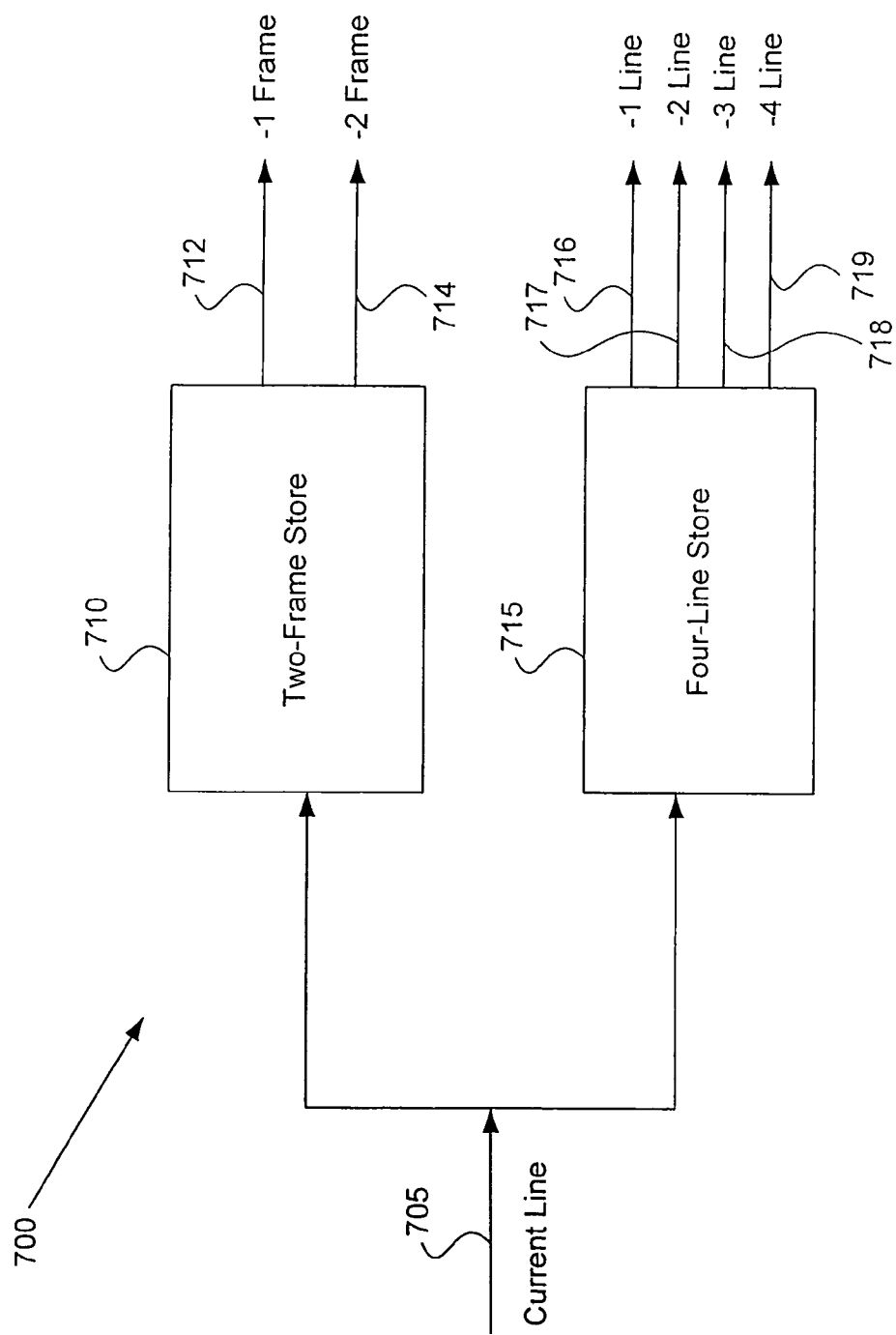
FIG. 7 illustrates a memory storage for use in the luminance and chrominance separation system of FIG. 6.

Turning to FIG. 7, storage 605 of FIG. 6 is shown in more detail in accordance with one embodiment of the present invention. As shown, storage 700 includes two-frame store 710 and four-line store 715. Storage 700 receives current line 705, which is then directed for storage in both two-frame store 710 and four-line store 715. Storage 700 enables Y/C separation system 600 to operate on two previous frames, namely −1 frame 712 and −2 frame 714, and four previous lines, namely −1 line 716, −2 line 717, −3 line 718 and −4 line 719, concurrently, to select the best data to use for separation on pixel-to-pixel basis. Because data is stored in composite format in storage 700, Y/C separation system 600 performs the comparisons in the demodulated color space (UV color space) and composite or luma color space, which provides the ability to consider both color spaces simultaneously to determine whether or not to use the comb filter.

In one embodiment of the present invention, four-line store 715 may be a single port RAM, including four lines of composite data and the detected horizontal sync bit. To accommodate the PAL square pixel mode, which requires the most amount of memory, the RAM may include 3776x11 bits, which is 4 lines multiplied by 944 samples per line, where each sample includes 10 bits and one bit is used for the horizontal sync detect.

Chroma demodulation 612 is used to recover chroma U and V data from the modulated chrominance information. For CVBS signals, all the lines and frames are demodulated separately in order to avoid having to store UV and CVBS data. For S-Video signals, only the current line needs to be demodulated since the comb filter is not active. For YUV signals, there is no need for demodulation, but the low pass filter is still used to upsample the multiplexed UV data to the nominal sample rate. The modulated chrominance information can be represented as:

chrominance=$U \sin \omega t + V \cos \omega t$

The U data is obtained by multiplying the chrominance information by ($2 \sin \omega t$), while V data is obtained by multiplying the chrominance information by ($2 \cos \omega t$), where $\omega = 2\pi F_{sc}$.

$U = (U \sin \omega t + V \cos \omega t)(2 \sin \omega t) = U - (U \cos 2\omega t) + (V \sin 2\omega t)$ $V = (U \sin \omega t + V \cos \omega t)(2 \cos \omega t) = V + (V \cos 2\omega t) + (U \sin 2\omega t)$ The Quadrature Amplitude Modulation or (QAM) modulation requires a precise phase lock to the original carrier signal. A digital Phase Locked Loop (PLL), which is discussed below, in combination with a reference burst provided during the back porch portion of the video signal, provides a phase locked carrier for the chroma demodulation 612. In one embodiment, PLL is locked to the current line, with all other lines slaved to it. Since adjacent lines have a different phase than the current line, a phase adjust block provides the 90° (PAL only), or 180° shift through simple inversion and sin/cos swapping. The 2ωt components are then removed by low pass filters, which also bandwidth limit the chroma signal. This approach, inter alia, limits the luma artifacts generated by the comb filtering process. In YUV mode, zeros are inserted between every input sample, doubling the data rate. The resulting signal image is then filtered out by low pass filters having selectable bandwidth.

The demodulation signal must have the exact same phase and frequency as the modulation subcarrier originally used by the encoder in order to properly decode the color information. A reference color burst is added to the back porch region of the signal, so that a PLL or subcarrier generator 614 may generate this subcarrier. In one embodiment, subcarrier generator 614 includes a phase detector, a loop filter and a discrete time oscillator.

Since the data is stored in storage 605 as composite video, which is a combination of lumas and chromas, current line 705 includes a reference subcarrier. Y/C separation system 600 uses subcarrier generator 614 to lock on that reference subcarrier and use that reference subcarrier to generate a signal to demodulate chroma portion to its U and V components. Y/C separation system 600 obtains the reference subcarrier for the current line and applies a vector rotation of 90 or 180 degrees rotation to the reference subcarrier of the current line for use with all other points without tracking the subcarrier for each point.

The phase detector of subcarrier generator 614 produces a signed value proportional to the phase difference between the subcarrier and the color burst reference. The low pass filtered UV data is fed to a pair of integrators that accumulate during the burst gate. This gate is opened for four pixels after a programmable delay from the falling edge of the detected horizontal sync. The output of these accumulators is fed into a two line averaging filter, which is needed since the burst in PAL mode alternates between 135° and 225° on adjacent lines. This produces a +V and −V component of equal magnitude on adjacent lines. Averaging any two lines should thus produce a zero V component. This alternation of the sign of the V component is also used to detect the presence of PAL signals and the phase of the V switch. The U phase error component is added to the V if V is positive, and subtracted if V is negative so that it always increases the magnitude of the error.

Even though the phase difference from line to line is 90° (for PAL) or 180° (for NTSC), certain systems, such as some VCRs, do not adhere to this standard, i.e. subcarrier phase compared to line. Y/C separation system 600 examines the U and V values of the color burst portion, i.e. the subcarrier phase, to determine whether there is a 90° or 180° relationship from line to line, and if such relationship does not exist, Y/C separation system 600 disables the comb filtering operation.

The loop filter of subcarrier generator 614 is a second order low pass filter with one pole and one zero. When combined with the pole from the discrete time oscillator, the overall response is a first order low pass filter with peaking around the cutoff frequency.

The discrete time oscillator of subcarrier generator 614 is used to generate an address that cycles through the Sine Cosine ROM at the frequency of the subcarrier. To enable the discrete time oscillator to track changes, a factor is used to modify the basic frequency. Also, an error signal generated by the phase detector and the loop filter is used in NTSC and PAL to modify the basic frequency allowing the frequency to lock to the color burst reference. However, SECAM does not use such error signal, since a free running oscillator is used in that mode.

Subcarrier generator 614 a chroma killer logic to remove the chrominance information if its amplitude is too low. The chroma killer logic monitors four U pixels that are accumulated during the color burst. The ideal accumulated U value is −28.0×4=−112.0 (S10.2) for NTSC and −20.75×4=−83.0 (S10.2) for PAL. If the accumulated U value has a smaller magnitude than (more positive than) −8.0 (7% NTSC, 10% PAL) for 127 consecutive lines, a signal is asserted. This signal is used by a chroma AGC logic to force the gain value to zero. If the accumulated U value has a greater magnitude than (more negative than) −16.0 (14% NTSC, 19% PAL) for 127 consecutive lines, the signal will be deasserted.

In PAL, the phase of V is reversed every other line. Subcarrier generator 614 includes a PAL switch logic for generating a PAL switch signal that alternates each line to show when the phase of V is reversed. This occurs by monitoring the sign of the V data during the color burst reference. The PAL switch signal is generated to be low when the sign of V is positive (V phase is not reversed) and high when the sign of V is negative (V phase is reversed). If the PAL switch logic ever detects that the PAL switch signal is out of synchronization with the sign of V, the PAL switch logic monitors the V sign for 12 consecutive lines before resynchronizing the PAL switch signal.

Subcarrier generator 614 includes a subcarrier lock logic, which generates a subcarrier lock signal for use as a status bit to indicate whether or not the subcarrier tracking loop is locked. The subcarrier lock logic has 16 lines of hysteresis. To accomplish the hysteresis, a counter is updated for each line based on the magnitude of the V error. When the magnitude of the V error is less than 32, the counter will increment up to a maximum of 15. At this time the subcarrier lock signal will be asserted. When the magnitude of the V error is greater than or equal to 32, the counter will decrement to a minimum of zero, where the subcarrier lock signal will be deasserted.

Continuing with FIG. 6, Y/C separation system 600 includes chroma comb filter 615, which uses simple addition and subtraction to determine the pixels with the highest degree of correlation with the current pixel and to extract the chrominance from these pixels. Since each sample includes luma and chroma components, the difference between two pixels could be due to either luminance or chrominance difference, and there is not sufficient information to distinguish them. Thus, chroma comb filter 615 determines the combination of pixels in which the total difference is the smallest, and uses that information to extract the chroma component. Since on each adjacent line or frame chroma is out of phase with the current line, that means that subtracting the two pixels does not lead to the difference between the pixels, but rather the luma component plus the difference.

In the NTSC mode, the addition of another pair of lines gives access to two lines that are in phase with the current line, which makes a true comparison possible. Similarly, another frame store gives access to an in-phase pixel for the 3D comb filter. In the PAL mode, the additional lines (or frame) are 180° out of phase with the current line, which makes it similar to the NTSC mode before the additional storage.

Figure 8A:
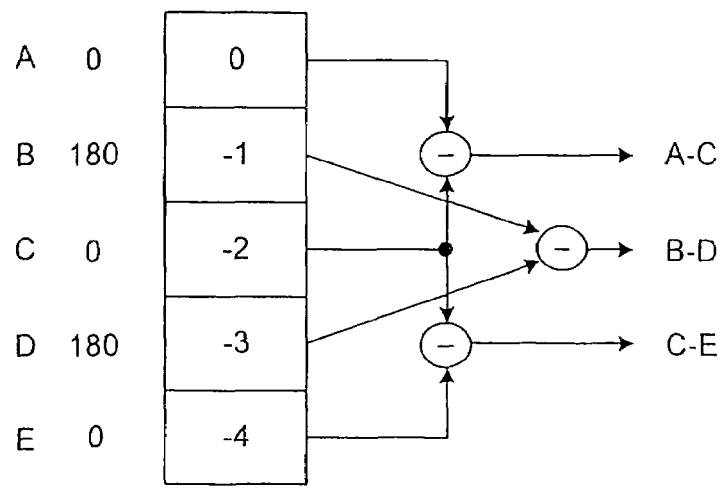
FIG. 8A illustrates a comb filter error calculator for use in the NTSC mode of the luminance and chrominance separation of FIG. 6.

FIG. 8A illustrates input line A and four stored lines B, C, D and E, in the NTSC mode. As shown, there is a 180° phase difference between A and B, B and C, C and D, and D and E. Further, lines that are two apart have the same phase. In one embodiment of the present invention, in order to perform the error calculation in the NTSC mode, pixels that are two lines apart are used for error correction. For example, the differences between lines A and C, B and D, and C and E and calculated. These differences are then used to find the most similar lines, i.e. the lowest difference. In one embodiment, if all of the three differences are above a certain threshold, then a notch filter may be used for the separation.

The three error terms (the difference between pixels) come from the subtraction of in-phase vectors:

$err\_3d = frame[-2] - frame[0] = |u[-2,0] - u[0]| + |v[-2,0] - v[0]|$ $err\_3\_ln = line[-1] - line[1] = |u[0,-1] - u[0,1]| + |v[0,-1] - v[0,1]|$ $err\_prev = line[0] - line[-2] = |u[0,0] - u[0,-2]| + |v[0,0] - v[0,-2]|$ $err\_next = line[0] - line[2] = |u[0,0] - u[0,2]| + |v[0,0] - v[0,2]|$ where line[0] is defined as the current line, line[1] as the next line, line[−1] as the previous line and so on. A gross approximation of the vector size is used, but a more accurate estimation can be made using: $err = \max(|u_{diff}|, |v_{diff}|) + (3/8) * \min(|u_{diff}|, |v_{diff}|)$.

Each of the error terms are compared to a threshold value if the enable for that error term is active, which allows any of the comb terms to be disabled by setting its enable to zero, or forced by setting all other enables to zero. The priority in the event of a tie is 3D, three line, previous line, next line, and notch filter (band pass filtered line[0]).

The minimum error is used to select the comb from the combinations below:

$c\_3d = \frac{1}{2}(frame[0] + frame[-1])$ $c\_3\_ln = \frac{1}{4}((line[0] + line[1]) + (line[0] + line[-1]))$ $c\_rev = \frac{1}{2}(line[0] + line[-1])$ $c\_next = \frac{1}{2}(line[0] + line[1])$ For the purpose of chroma comb filter calculation in the NTSC mode, pixels that are one line apart may be used. For example, lines B, C and D can be used for comb filter calculation, as follows: C±B, C±D and 2C±(B+D).

Figure 8B:
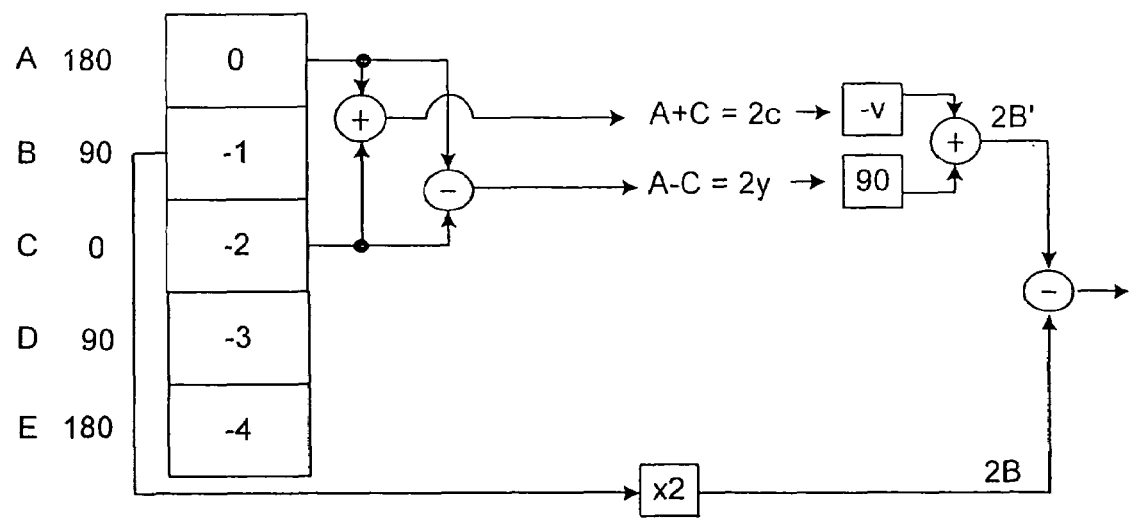
FIG. 8B illustrates a comb filter error calculator for use in the PAL mode of the luminance and chrominance separation of FIG. 6.

FIG. 8B illustrates input line A and two stored lines B and C, in the PAL mode. As shown, there is a 90° phase difference between A and B, and B and C. Further, there is a 180° phase difference between A and C and between C and E. In one embodiment of the present invention, the error calculation in the PAL mode can be obtained by the calculation shown in FIG. 8B. As shown, A and C are added to generated twice chroma or 2c, which is the subjected to a V switch. Further, C is subtracted from A to generate twice luma or 2y, which is then subjected to a 90° rotation. When the results of these two calculations are added, the value that is achieved should be twice B (or 2B), which is referred to as 2B'. Next, B is multiplied by 2 to obtain the actual 2B. Lastly, to determine the error term, 2B' is subtracted from 2B. Further, similar calculations that are performed using A/C/B, will also be performed using B/D/C and C/E/D to obtain two more error terms. The three error terms in PAL mode may then be used similar to the three error values obtained in NTSC mode above.

As described above, in PAL mode, the algorithm for finding the error term is quite different, though the comb filtering is very similar. As discussed, to find the error, the average chroma and luma vectors are found for each possible combination. The luma vector is then rotated 90° in the proper direction. This can be either forward or back depending on whether the check is for the previous or next line comb, and depending on the PAL standard. The rotated luma is added to the chroma vector, and the resultant vector is compared to the adjacent line or frame.

To compute the error terms the average chroma and luma components in the UV space are determined, as follows:

$cu\_3d = \frac{1}{2}(u[0,0] + u[-2,0])$, $cv\_3d = \frac{1}{2}(v[0,0] + v[-2,0])$ $cu\_3\_ln=\frac{1}{2}(u[0,1]+u[0,-1])$, $cv\_3\_ln=\frac{1}{2}(v[0,1]+v[0,-1])$ $cu\_prev=\frac{1}{2}(u[0,0]+u[0,-2])$, $cv\_prev=\frac{1}{2}(v[0,0]+v[0,-2])$ $cu\_next=\frac{1}{2}(u[0,0]+u[0,2])$, $cv\_next=\frac{1}{2}(v[0,0]+v[0,2])$ $lu\_3d=\frac{1}{2}(u[0,0]-u[-2,0])$, $lv\_3d=\frac{1}{2}(v[0,0]-v[-2,0])$ $lu\_3\_ln=\frac{1}{2}(u[0,1]-u[0,-1])$, $lv\_3\_ln=\frac{1}{2}(v[0,1]-v[0,-1])$ $lu\_prev=\frac{1}{2}(u[0,-2]-u[0,0])$, $lv\_prev=\frac{1}{2}(v[0,0]-v[0,-2])$ $lu\_next=\frac{1}{2}(u[0,2]-u[0,0])$, $lv\_next=\frac{1}{2}(v[0,0]-v[0,2])$ Next, the average luminance vectors are rotated by +/−90°, as shown:

$lu\_3d=lv\_3d$, $lv\_3d=-lu\_3d$ $lu\_3\_ln=-lv\_3\_ln$, $lv\_3\_ln=lu\_3\_ln$ $lu\_prev=lv\_prev$, $lv\_prev=-lu\_prev$ $lu\_next=-lv\_prev$, $lv\_next=lu\_prev$ Combining the luminance vector and the chrominance vector results in an average composite vector for the adjacent line or frame. However, these vectors also have the opposite sign on the V component of the chroma due to the PAL switch, which must be taken into account when combining these terms. The error terms then are computed as the difference between the computed composite vectors, as shown here:

$err\_3d=|cu\_3d+lv\_3d-u[-1]|+|-cv\_3d-lu\_3d-v[-1]|$ $err\_3\_ln=|cu\_next-lv\_3\_ln-u[1]|+|-cv\_3\_ln+lu\_3\_ln-v[1]|$ $err\_prev=|cu\_prev+lv\_prev-u[-1]|+|-cv\_prev-lu\_prev-v[-1]|$ $err\_next=|cu\_next-lv\_next-u[1]|+|-cv\_next+lu\_next-v[1]|$ In the PAL mode, pixel by pixel adaptation may be disabled, since three pixels are used in the error calculation, and it is possible for two to destructively interfere and cause an erroneously small result. Since only one term is rotating, however, the odds of two successive calculations canceling in this way are very low. For this reason, two minimum error terms in a row are required to change the mode. As in the case of NTSC, if all of the enabled error terms are above a threshold, the notch filter is used. Otherwise one of the following operations are performed:

$c\_3d=\frac{1}{2}(frame[0]+frame[-2])$ $c\_3\_ln=\frac{1}{2}((line[0]-line[-1])+(line[0]+line[1]))$ $c\_prev=\frac{1}{2}(line[0]+line[-2])$ $c\_next=\frac{1}{2}(line[0]+line[2])$ For both NTSC and PAL modes, there are four modes of operation for the notch filter. In its first mode of operation, the notch filter is disabled, which forces the lowest error comb filter to be selected. In the second mode of operation, which can be referred to as chroma mode, the notch filter interprets anything that cannot be comb filtered as chroma. In the second mode, the bandpass filtered composite data is output to chroma remod 625 without any averaging, which produces strong cross-chroma artifacts with a high vertical chroma resolution. In the third mode of operation or half mode, the notch filter splits data that cannot be comb filtered into equal parts of luma and chroma. In one embodiment, the half mode is the default mode of operation for the notch filter, which has a 6 dB rejection of both cross-luma and cross-chroma artifacts. In the fourth mode of operation, which can be referred to as the luma mode, the notch filter interprets non-comb filtered data as luminance, which has a strong cross-luma artifacts and a low vertical chroma resolution.

Continuing with FIG. 6, non-complimentary luma comb 620 is included to remove cross-luma artifacts from areas of high frequency chroma, since sources such as DVD players and signal generators have chroma bandwidths that can exceed broadcast standards. The basic operation of luma comb 620 is to low pass filter the full bandwidth composite data and subtract two adjacent lines or frames to find the error. If this error is below a first threshold and the corresponding chroma comb error was also below a second threshold, the two full bandwidth composite pixels are averaged together.

In one embodiment, chroma data and luma data for two adjacent lines or pixels can be obtained obtaining and then determined whether there is a match or correlation between the two lines. If chroma comb filter 615 indicates a correlation and luma comb filter 620 indicates no correlation, chroma comb filter 615 and luma comb filter 620 are used in the complimentary mode, else if chroma comb filter 615 indicates a correlation and luma comb filter 620 indicates a correlation, chroma comb filter 615 and luma comb filter 620 are used in the non-complimentary mode. Further, if neither chroma comb filter 615 nor luma comb filter 620 indicates a correlation, chroma comb filter 615 and luma comb filter 620 are disabled.

The low pass filters can be the same length as those used in the chroma demodulator to preserve a pipeline delay of the two signals relative to each other. There can also be three bandwidth settings. Since any residual chroma inside the bandwidth of the filter will be seen as twice the error for being out-of phase, the bandwidth should not include any of the chroma bandwidth. Generally, the higher the chroma bandwidth, the lower the bandwidth setting. Since the PAL carrier is higher than NTSC, higher settings can be used for PAL. Also, for PAL signals, the low pass filters take their input from frame[−2], line[−2] and line[2] to access the pixels with out-of-phase chroma. In all other respects, the operations in PAL and NSTC are substantially identical. In one embodiment, since the low pass filtered data is not be used for anything other than error computation, it does not need to have 60 dB rejection of the stop band.

Similar to chroma comb filter 615, luma comb filter 620 has various enable signals for each of the combinations available to it. Since the error term is generated over a relatively low bandwidth, luma comb 620 artifacts are readily visible and the results of the chroma comb error checking algorithm are used as well. In other words, the chroma for the two pixels should be equal, as well as any non-chroma signals. Thus, to be selected, the error must be below a threshold, and the mode must be enabled, but not necessarily selected, in chroma comb 615.

Since chroma comb filter 615 relies on in-phase pixels to compute error, but uses a different out-of-phase pixel for the actual comb filter, this can cause false detections in areas of high vertical frequency (2D), or areas of rapid oscillation in time (3D). Further, in the case of 3D spatial-temporal aliasing may occur, where high vertical or horizontal frequency combined with low frequency movement can cause erroneous results. For 2D applications, however, the artifacts caused by these anomalies may not be readily apparent, though in 3D applications such artifacts can be apparent and, thus, an additional check is made to determine if motion is present near the current pixel.

In the NTSC mode, the full bandwidth composite pixel is subtracted from the one two frames back, which is fed into a shift register the same length as the low pass filter. An up/down counter counts the number of ones in the shift register, and this number is compared to a threshold. If exceeded, the circuit determines that too much motion is present in the immediate area to reliably use the 3D comb filter.

Luma comb filter 620 modes are 3D, three-line, previous-line, next-line and no-filter. In the no-filter mode, the full bandwidth signal is output to chroma remod 625, which allows a fallback to the complimentary comb filter, which can remove the cross luma from within the chroma LPF bandwidth. In addition, the above-described notch filter can also be utilized. It should be noted that if any of the luma comb filters is used, an enable signal is sent to chroma remod 625 to prevent chroma remod 625 from subtracting the remodulated chroma from the luma signal.

Turning to chroma remod 620, if luma comb 620 is enabled for the current pixel, chroma remod 625 simply passes both luma and chroma data through. Otherwise, comb filtered chroma vector is first quadrature modulated back up to the sub-carrier frequency and then subtracted from the composite signal, to generate the luminance data. To this end, the exact phase and frequency of the original signal must be recreated, for example, by a pipelined delayed 12-bit phase address from the sub-carrier generator to match the chroma signal. Since the tracking loop in subcarrier generator 614 is operating on the current line and current frame, there is no need to delay the signal for more than the pipeline delay through chroma demod 610 and comb filter chroma filter 615.

Since SECAM uses an FM modulated signal, a carrier is always present, regardless of whether or not color information is being broadcast, which results in a visible artifact in the luminance at the carrier frequency. To minimize this effect, an "Inverse Bell" filter is applied at the encoder to attenuate color frequencies near the Dr and Db carriers. Thus, if little or no color information is present in the signal, the carriers will be reduced in amplitude. To properly decode the color information, the receiver must undo the above process. The "Bell" filter 630 is defined by standard to have the transfer function:

$$11.5 \frac{1+j15F}{1+j1.26F} \text{ where } F = \frac{fsc}{4286000} - \frac{4286000}{fsc}$$

This bandpass filter was generated from a low pass prototype filter. Since the SECAM signal has been rotated to baseband already, the original prototype filter can be used, which may be accomplished by taking the real parts of the pole/zero pairs from the bandpass filter. The filter is then put through the bilinear transform to get the final digital filter coefficients. Since the signal is now in the UV space, the filter is complex, but the high-speed clock allows for the entire circuit to be re-used for both U and V channels, except for the feedback register.

The methods and systems presented above may reside in software, hardware, and/or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A method of controlling a comb filter for comb filtering a plurality of video signal lines to demodulate a chrominance portion of each of said plurality of video signal lines into U and V components, said method comprising:
   determining a first reference subcarrier of a first video signal line of said plurality of video signal lines;
   demodulating said chrominance portion of said first video signal line into first U and V components using said first reference subcarrier;
   using said first U and V components to determine a number of degrees of rotation of said first reference subcarrier from a second reference subcarrier of a second video signal line previous to said first video signal line; and
   disabling said comb filter if said number of degrees is different from a predetermined number of degrees.

2. The method of claim 1, wherein said predetermined number of degrees is 90 degrees.

3. The method of claim 1, wherein said predetermined number of degrees is 180 degrees.

4. The method of claim 1 further comprising: enabling said comb filter if said number of degrees is the same as said predetermined number of degrees.

5. A decoder comprising:
   a comb filter configured to filter a plurality of video signal lines;
   a subcarrier generator configured to determine a first reference subcarrier of a first video signal line of said plurality of video signal lines;
   a demodulator configured to demodulate said chrominance portion of said first video signal line into first U and V components using said first reference subcarrier; and
   wherein said decoder uses said first U and V components to determine a number of degrees of rotation of said first reference subcarrier from a second reference subcarrier of a second video signal line previous to said first video signal line, and said decoder disables said comb filter if said number of degrees is different from a predetermined number of degrees.

6. The decoder of claim 5, wherein said predetermined number of degrees is 90 degrees.

7. The decoder of claim 5, wherein said predetermined number of degrees is 180 degrees.

8. The decoder of claim 5, wherein said decoder enables said comb filter if said number of degrees is the same as said predetermined number of degrees.

* * * * *